United States Patent
Lee et al.

(10) Patent No.: US 12,253,698 B2
(45) Date of Patent: Mar. 18, 2025

(54) MULTILAYER LIGHT-FILTERING STRUCTURE AND FABRICATING METHOD THEREOF

(71) Applicant: GCSOL Tech Co., Ltd., Taichung (TW)

(72) Inventors: Jyun-Yi Lee, Taichung (TW); Wei-Hung Chen, Taichung (TW)

(73) Assignee: GCSOL Tech Co., Ltd., Taichung (TW)

( * ) Notice: Subject to any disclaimer, the term of this patent is extended or adjusted under 35 U.S.C. 154(b) by 424 days.

(21) Appl. No.: 17/660,630

(22) Filed: Apr. 25, 2022

(65) Prior Publication Data
US 2022/0357492 A1    Nov. 10, 2022

(30) Foreign Application Priority Data
May 7, 2021    (TW) .................................. 110116503

(51) Int. Cl.
*G02B 5/28*    (2006.01)
*G02B 1/00*    (2006.01)
*G02B 5/22*    (2006.01)

(52) U.S. Cl.
CPC ............. *G02B 5/285* (2013.01); *G02B 1/002* (2013.01); *G02B 5/22* (2013.01)

(58) Field of Classification Search
CPC ........... G02B 5/285; G02B 5/22; G02B 1/002
USPC ......................................................... 359/589
See application file for complete search history.

(56) References Cited

U.S. PATENT DOCUMENTS

| | | | |
|---|---|---|---|
| 2007/0002414 A1* | 1/2007 | Stuck ................ | H01L 27/14625 257/E31.127 |
| 2015/0015940 A1* | 1/2015 | Nakajima .............. | G02B 5/282 359/359 |
| 2016/0139308 A1* | 5/2016 | Kim .................. | H01L 27/14625 359/359 |
| 2016/0349573 A1* | 12/2016 | Ohmuro ................ | G02F 1/1336 |
| 2017/0102601 A1* | 4/2017 | Luten ................... | E06B 3/6715 |
| 2018/0095203 A1* | 4/2018 | Ooi ........................ | C03C 17/42 |
| 2019/0011618 A1* | 1/2019 | Delst ........................ | C09D 5/36 |
| 2019/0064407 A1* | 2/2019 | Krogman ................ | B32B 27/36 |
| 2021/0349241 A1* | 11/2021 | Gu ......................... | H10K 59/40 |

FOREIGN PATENT DOCUMENTS

| | | |
|---|---|---|
| CN | 101057341 A | 10/2007 |
| CN | 107113372 A | 8/2017 |
| CN | 109416560 A | 3/2019 |

(Continued)

*Primary Examiner* — William R Alexander
(74) *Attorney, Agent, or Firm* — CKC & Partners Co., LLC

(57) ABSTRACT

A multilayer light-filtering structure includes a substrate, a light-filtering layer and a patterned light-blocking layer. The light-filtering layer is disposed on a surface of the substrate, in which the light-filtering layer has a first surface away from the substrate, and the light-filtering layer includes a plurality of high refractive index films and a plurality of low refractive index films. The low refractive index films are correspondingly overlapped with the high refractive index films. The patterned light-blocking layer is disposed on the first surface and includes a plurality of metal material films and a plurality of dielectric films. The dielectric films are correspondingly overlapped with the metal material films.

13 Claims, 9 Drawing Sheets

(56) References Cited

FOREIGN PATENT DOCUMENTS

| | | |
|---|---|---|
| CN | 112230311 A | 1/2021 |
| CN | 112462463 A | 3/2021 |
| TW | 200506272 A | 2/2005 |

\* cited by examiner

MULTILAYER LIGHT-FILTERING STRUCTURE AND FABRICATING METHOD THEREOF

RELATED APPLICATIONS

This application claims priority to Taiwan Application Serial Number 110116503, filed May 7, 2021, which is herein incorporated by reference.

BACKGROUND

Technical Field

The present disclosure relates to a multilayer light-filtering structure and a fabricating method thereof. More particularly, the present disclosure relates to a multilayer light-filtering structure with various selectable colors and high distance-measuring accuracy or high detecting accuracy and the fabricating method thereof.

Description of Related Art

An optical filter is able to be transmitted the light with specific wavelength or block the light with specific wavelength. Therefore, the optical filters are usually used for enhancing the intensity of light signal or enhancing the clarity of imaging, and are widely applied in the fields such as photography, optical instruments, lighting equipment and panels.

Optical filters can be categorized by their ranges of the passband, in which a near infrared optical filter allows infrared light close to the visible wavelength pass though the structure thereof. However, the color of the conventional near-infrared light filter is limited to dark color due to properties thereof, resulting in the limited aesthetics and concealability of the conventional near-infrared light filter. Besides, when a conventional single layer near-infrared light filter is applied in instruments for distance measuring or detecting, the detecting accuracy is usually being decreased by noise lights such as ambient light or light reflected by the instrument itself.

In order to solve the aforementioned issues, developing a multilayer light-filtering structure with various selectable colors and high distance-measuring accuracy or high detecting accuracy and the fabricating method thereof has become an important objective of the related industries.

SUMMARY

According to one aspect of the present disclosure, a multilayer light-filtering structure includes a substrate, a light-filtering layer and a patterned light-blocking layer. The light-filtering layer is disposed on a surface of the substrate, in which the light-filtering layer has a first surface away from the substrate, and the light-filtering layer includes a plurality of high refractive index films and a plurality of low refractive index films. The low refractive index films are correspondingly overlapped with the high refractive index films. The patterned light-blocking layer is disposed on the first surface and includes a plurality of metal material films and a plurality of dielectric films. The dielectric films are correspondingly overlapped with the metal material films.

According to another aspect of the present disclosure, a multilayer light-filtering structure fabricating method includes providing a substrate, performing a light-filtering layer deposition step, performing a photoresist coating step, performing a selective exposure step, performing a light-blocking layer deposition step and performing a photoresist stripping step. In the light-filtering layer deposition step, a plurality of high refractive index films and a plurality of low refractive index films are deposited on a surface of the substrate by a first physical vapor deposition method, the low refractive index films are correspondingly overlapped with the high refractive index films so as to form a light-filtering layer, and the light-filtering layer has a first surface away from the substrate. In the photoresist coating step, a liquid photoresist or a dryfilm photoresist is coated on the first surface so as to form a photoresist layer. In the selective exposure step, the photoresist layer is selectively exposed by a mask aligner and a mask and developed by a developer so as to form a patterned photoresist, and the patterned photoresist is connected to the first surface and has a second surface away from the light-filtering layer. In the light-blocking layer deposition step, a plurality of metal material films and a plurality of dielectric films are deposited on the first surface of the light-filtering layer and the second surface of the patterned photoresist by a second physical vapor deposition method, and the metal material films are correspondingly overlapped with the dielectric films so as to form a patterned light-blocking layer on the first surface of the light-filtering layer and form a plurality of patterned photoresist-containing light-blocking layers on the second surface of the of the patterned photoresist. In the photoresist stripping step, the patterned photoresist-containing light-blocking layers are stripped by a photoresist stripper so as to form a multilayer light-filtering structure.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
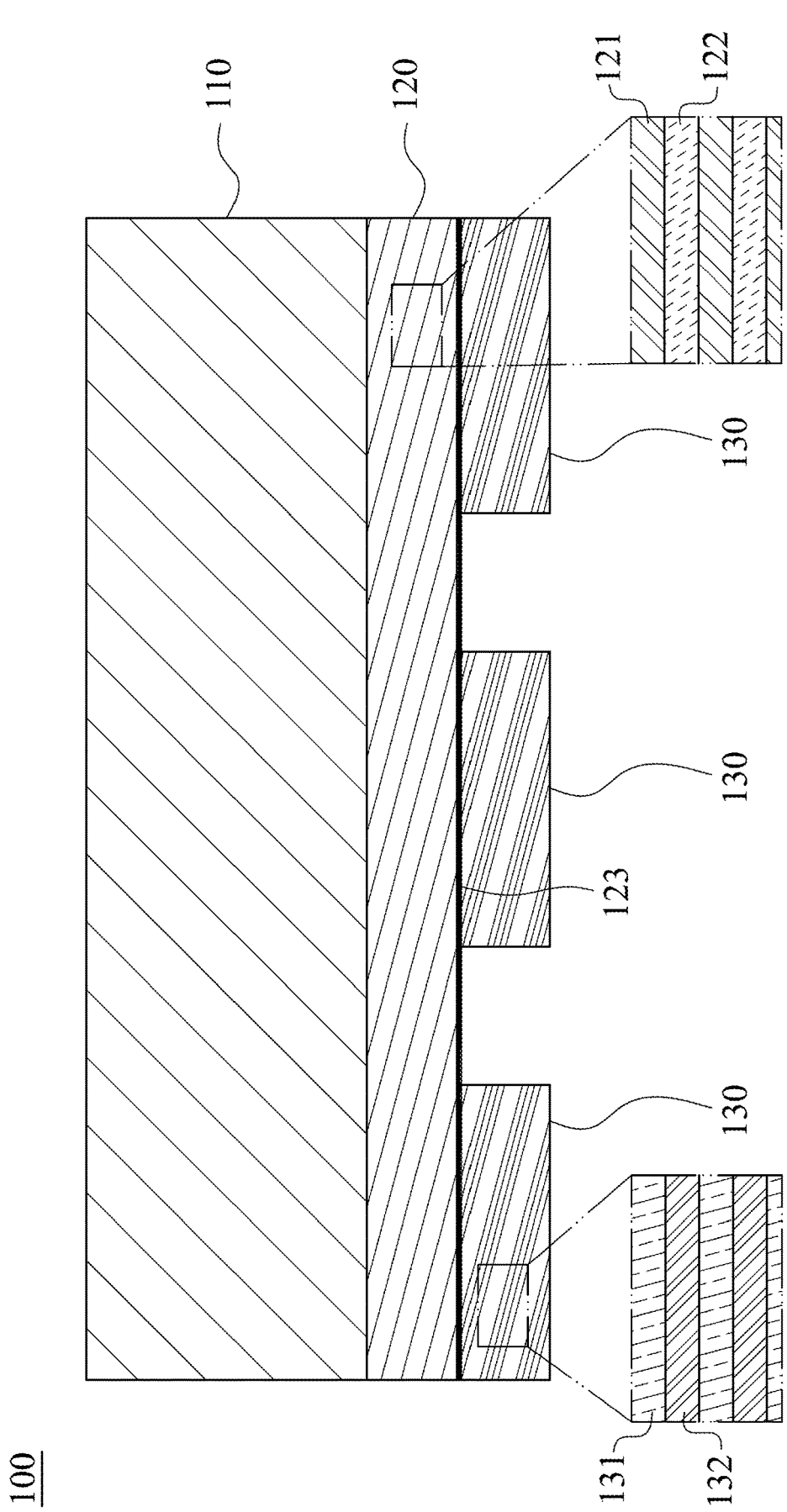
FIG. 1 is a structure schematic view of a multilayer light-filtering structure according to one example of one embodiment of the present disclosure.

Please refer to FIG. 1, which is a structure schematic view of a multilayer light-filtering structure 100 according to one example of one embodiment of the present disclosure. The multilayer light-filtering structure 100 includes a substrate 110, a light-filtering layer 120 and a patterned light-blocking layer 130. The substrate 110 can be transparent materials such as glass and plastic, but the present disclosure is not limited thereto. The light-filtering layer 120 is disposed on a surface of the substrate 110, wherein the light-filtering layer 120 has a first surface 123 away from the substrate 110, and the light-filtering layer 120 includes a plurality of high refractive index films 121 and a plurality of low refractive index films 122. The low refractive index films 122 are correspondingly overlapped with the high refractive index films 121. The patterned light-blocking layer 130 is disposed on the first surface 123 of the light-filtering layer 120, and the patterned light-blocking layer 130 includes a plurality of metal material films 131 and a plurality of dielectric films 132. The dielectric films 132 are correspondingly overlapped with the metal material films 131.

The light-filtering layer 120 of the multilayer light-filtering structure 100 includes at least one passband in a wavelength range of 700 nm to 1400 nm, a transmittance of the at least one passband is $T_1$, and the following condition can be satisfied: $T_1>70\%$. Further, the following condition can be satisfied: $T_1>95\%$. In detail, the high refractive index films 121 and the low refractive index films 122 of the light-filtering layer 120 have different refractive indexes and extinction coefficients. A refractive index in a wavelength range of 400 nm to 1400 nm of each of the high refractive index films is $n_1$, an extinction coefficient in a wavelength range of 400 nm to 700 nm of each of the high refractive index films is $k_{11}$, an extinction coefficient in a wavelength range of 800 nm to 1400 nm of each of the high refractive index films is $k_{12}$, a refractive index in the wavelength range of 400 nm to 1400 nm of each of the low refractive index films is $n_2$, an extinction coefficient in the wavelength range of 400 nm to 1400 nm of each of the low refractive index films is $k_2$, and the following conditions can be satisfied: $k_{11}>0.01$, $k_{12}<0.01$, $k_2<0.01$, and $n_1>n_2$. By means of the difference between the refractive indexes and the extinction coefficients of the high refractive index films 121 and the low refractive index films 122, the light-filtering layer 120 can have at least one passband in the wavelength range of 700 nm to 1400 nm, and can have the effect that the transmittance $T_1$ is greater than 70%. Further, the attenuation of light intensity caused by light passing through the interface between the light-filtering layer 120 and the substrate 110 can also be decreased.

In detail, the high refractive index films 121 can be aluminum oxide films, titanium dioxide films, tantalum pentoxide films, niobium pentoxide films, silicon hydride films, silicon nitride films, germane films, zirconium dioxide films or the mixture films thereof, and the low refractive index films 122 can be aluminum oxide films, titanium dioxide films, tantalum pentoxide films, niobium pentoxide films, silicon hydride films, silicon nitride films, magnesium fluoride films or the mixture films thereof. A thickness of each of the high refractive index films 121 can be ranged from 3 nm to 800 nm, and a thickness of each of the low refractive index films 122 can be ranged from 3 nm to 800 nm, but the present disclosure is not limited thereto.

The brightness, the reflectivity, the transmittance, the absorption rate and the color of the multilayer light-filtering structure 100 of the present disclosure can be adjusted by arranging different combinations of applied materials of the high refractive index films 121 and the low refractive index films 122. In detail, the color and the brightness of the multilayer light-filtering structure 100 according to the present disclosure are defined as the definition of the CIELAB color space given by the International Commission on Illumination (CIE), wherein a L* value in a coordinate of CIELAB color space represents the brightness of a color (L*=0 represents black, and L*=100 represents 100), an a* value in a coordinate of CIELAB color space represents the green-red value of a color (negative value of a* value represents green, and positive value of a* value represents red), and a b* value in a coordinate of CIELAB color space represents the blue-yellow value of a color (negative value of b* value represents blue, and positive value of b* value represents yellow). Therefore, the brightness of the multilayer light-filtering structure 100 can be defined by the aforementioned CIELAB color space.

In particular, when the light-filtering layer 120 has a color of black, blue, green, yellow or red and the L* value of the light-filtering layer 120 in the coordinate of CIELAB color space is less than 40, a reflectivity in the wavelength range of 400 nm to 700 nm of the light-filtering layer 120 is $R_1$, a transmittance in the wavelength range of 400 nm to 700 nm of the light-filtering layer 120 is $T_2$, an absorption rate in the wavelength range of 400 nm to 700 nm of the light-filtering layer 120 is $A_1$, and the following conditions can be satisfied: $R_1<20\%$, $T_2<20\%$, and $A_1>70\%$. Further, the following conditions can be satisfied: $R_1<5\%$, $T_2<1\%$ and $A_1>95\%$. On the other hand, when the light-filtering layer 120 has a color of silver, blue, green, yellow or red, and the L* value of the light-filtering layer 120 in the coordinate of CIELAB color space is greater than 60, a reflectivity in the wavelength range of 400 nm to 700 nm in the light-filtering layer is $R_2$, and the following condition can be satisfied: $R_2>40\%$. Therefore, the properties and the color of the light-filtering layer 120 of the multilayer light-filtering structure 100 can be adjusted and chosen as demand, which is not only able to customize the properties of the multilayer light-filtering structure 100 for specific uses, but also enhances the aesthetics and concealability of the multilayer light-filtering structure 100.

The patterned light-blocking layer 130 of the multilayer light-filtering structure 100 can have a low reflectivity and a low transmittance, wherein the reflectivity and the transmittance of the patterned light-blocking layer 130 can be both less than 1%. Further, the reflectivity of the patterned light-blocking layer 130 can be less than 0.05% and the transmittance of the patterned light-blocking layer 130 can be less than 0.001%, but the present disclosure is not limited thereto.

In particular, the metal material films 131 of the patterned light-blocking layer 130 are tantalum films, titanium films, niobium films, aluminum films, zirconium films or the mixture films thereof, and the dielectric films 132 of the patterned light-blocking layer 130 are tantalum pentoxide films, silicon dioxide films, titanium dioxide films, niobium pentoxide films, aluminum oxide films, zirconium dioxide films or the mixture films thereof, but the present disclosure is not limited thereto.

Figure 2:
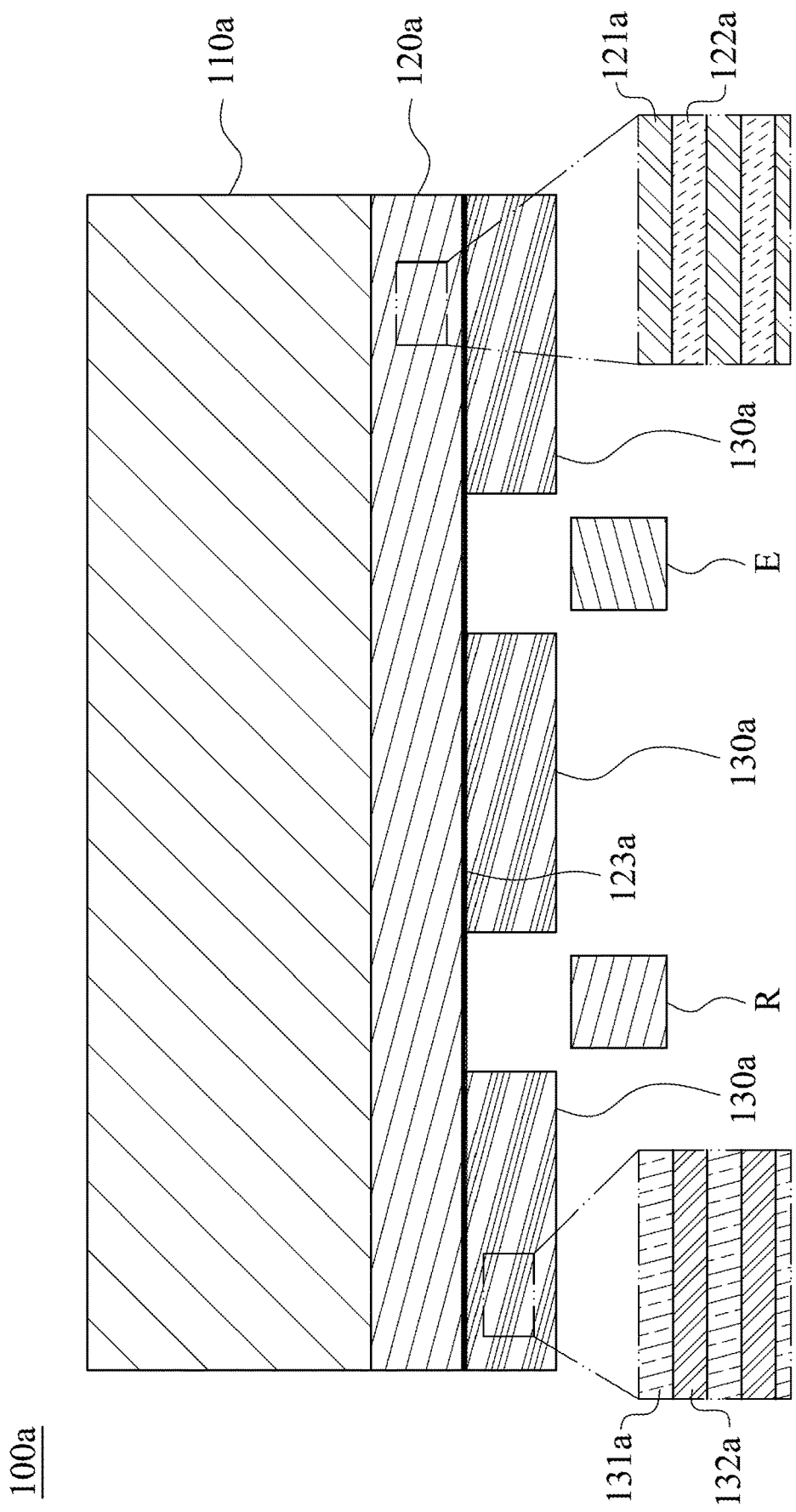
FIG. 2 is a structure schematic view of a multilayer light-filtering structure according to another example of one embodiment of the present disclosure.

Please refer to FIG. 2, which is a structure schematic view of a multilayer light-filtering structure 100a according to another example of one embodiment of the present disclosure. The multilayer light-filtering structure 100a includes a substrate 110a, a light-filtering layer 120a and a patterned light-blocking layer 130a, wherein the light-filtering layer 120a includes a plurality of high refractive index films 121a and a plurality of low refractive index films 122a, and the patterned light-blocking layer 130a includes a plurality of metal material films 131a, a plurality of dielectric films 132a. The structure and configuration of the substrate 110a, the light-filtering layer 120a, the patterned light-blocking layer 130a, the high refractive index films 121a, the low refractive index films 122a, the metal material films 131a and the dielectric films 132a are same as those of the substrate 110, the light-filtering layer 120, the patterned light-blocking layer 130, the high refractive index films 121, the low refractive index films 122, the metal material films 131 and the dielectric films 132 in FIG. 1, therefore will not be described again herein. When the multilayer light-filtering structure 100a is applied in the instruments or applied as the component for distance measuring or detecting, the multilayer light-filtering structure 100a can further be used with a light source E and a detector R, wherein the light source E and the detector R are independently disposed at the vacancy of the patterned light-blocking layer 130a, respectively. The patterned light-blocking layer 130a can block optical noises during the detector R receiving the light emitted by the light source E. The operating detail of the multilayer light-filtering structure of the present disclosure will be further described in the following paragraph, and will not be described herein.

Figure 3A:
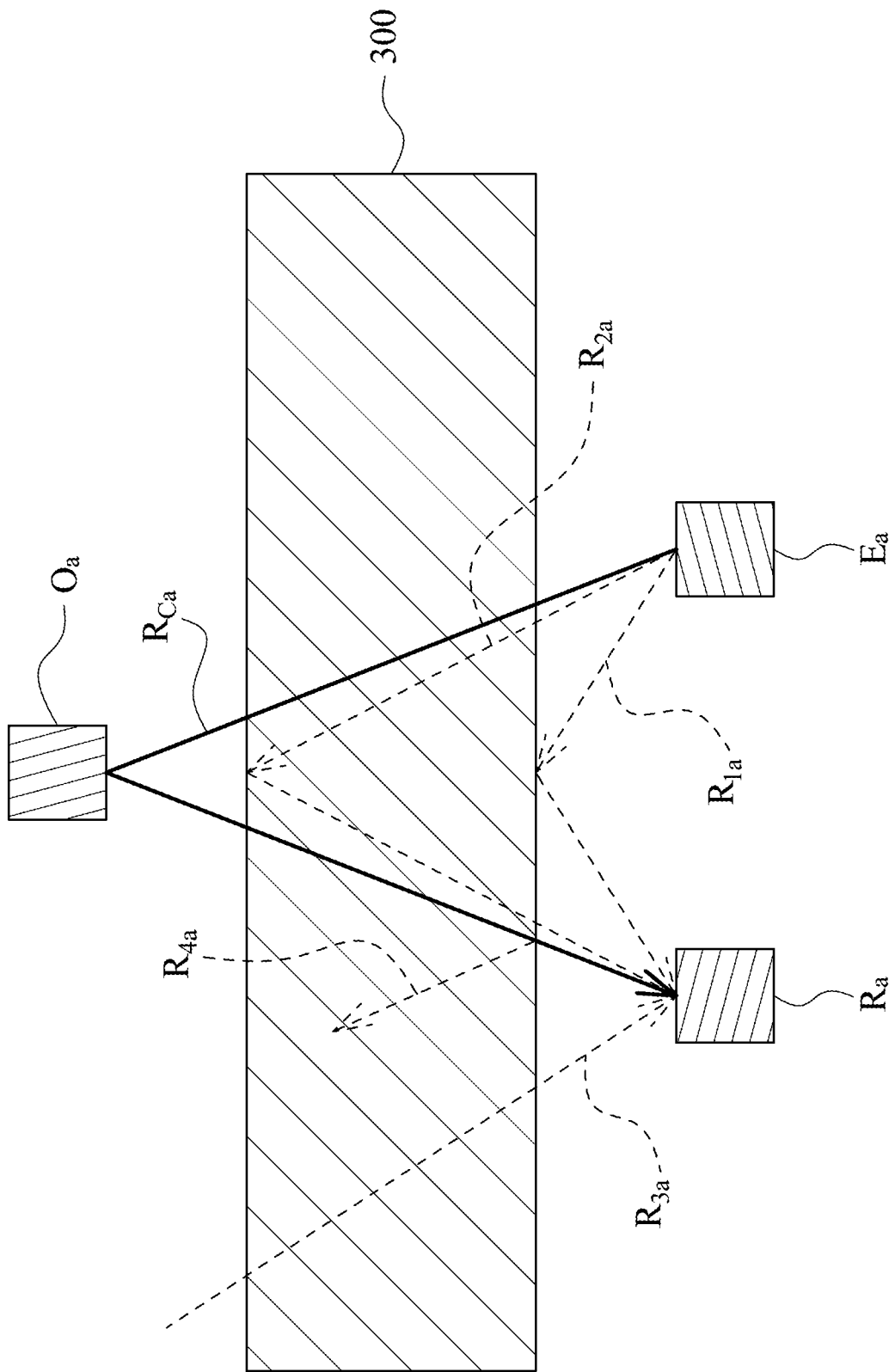
FIG. 3A is a light path schematic view of crosstalk light, noise light and attenuated reflected light in a conventional single layer light-filtering structure.

Please refer to FIG. 3A, which is a light path schematic view of crosstalk light, noise light and attenuated reflected light in a conventional single layer light-filtering structure. As shown in FIG. 3A, the conventional single layer light-filtering structure only includes a substrate 300 which is usually made of transparent glass or plastic materials. When the conventional single layer light-filtering structure is applied in the instruments or applied as the component for distance measuring or detecting, the substrate 300 is transmitted by light emitted by a light source $E_a$ along a path $R_{Ca}$, and the light is reflected after reaching an object $O_a$. Subsequently, the substrate 300 is transmitted by the light again, and then the light will be received by the detector $R_a$. The path $R_{Ca}$ mentioned above is a correct light path for distance measuring or detecting. However, there are lots of optical noises such as crosstalk light, noise light and attenuated reflected light pass along a path $R_{1a}$, a path $R_{2a}$, a path $R_{3a}$ and a path $R_{4a}$, respectively, and being detected by the detector $R_a$ or attenuated in practical use, which decreases the accuracy of the distance measuring or detecting. The detail of the crosstalk light, the noise light and the attenuated reflected light and the path thereof will be further described in the following paragraph.

The path $R_{1a}$ is a path passed by the crosstalk light, which is reflected by the light emitted by the light source Ea reaching the bottom of the substrate 300 and received by the detector $R_a$. The path $R_{2a}$ is a path passed by the crosstalk light, which is reflected by the light emitted by the light source $E_a$ reaching the top of the substrate 300 and received by the detector $R_a$. The path $R_{3a}$ is a path passed by the surrounding noise light, which is received by the detector $R_a$ after the light emitted by the surrounding light source passes through the substrate 300. The path $R_{4a}$ is a path passed by the attenuated reflected light, which is the phenomenon of partial light reflection that occurs when the light passing through various interfaces along the path $R_{Ca}$. Since the attenuated reflected light will not be received by the detector $R_a$, the intensity of the correct light signal received by the detector $R_a$ is much lower than the intensity of the light emitted by the light source $E_a$. More particular, in comparison with the light intensity of the light emitted by the light source $E_a$, the correct light signal received by the detector $R_a$ loses about 16.5% of the light intensity. According to the aforementioned reasons, the conventional single layer light-filtering structure has a lower accuracy and a lower received light intensity of the correct light signal during being applied in the instruments or applied as the component for distance measuring or detecting.

Figure 3B:
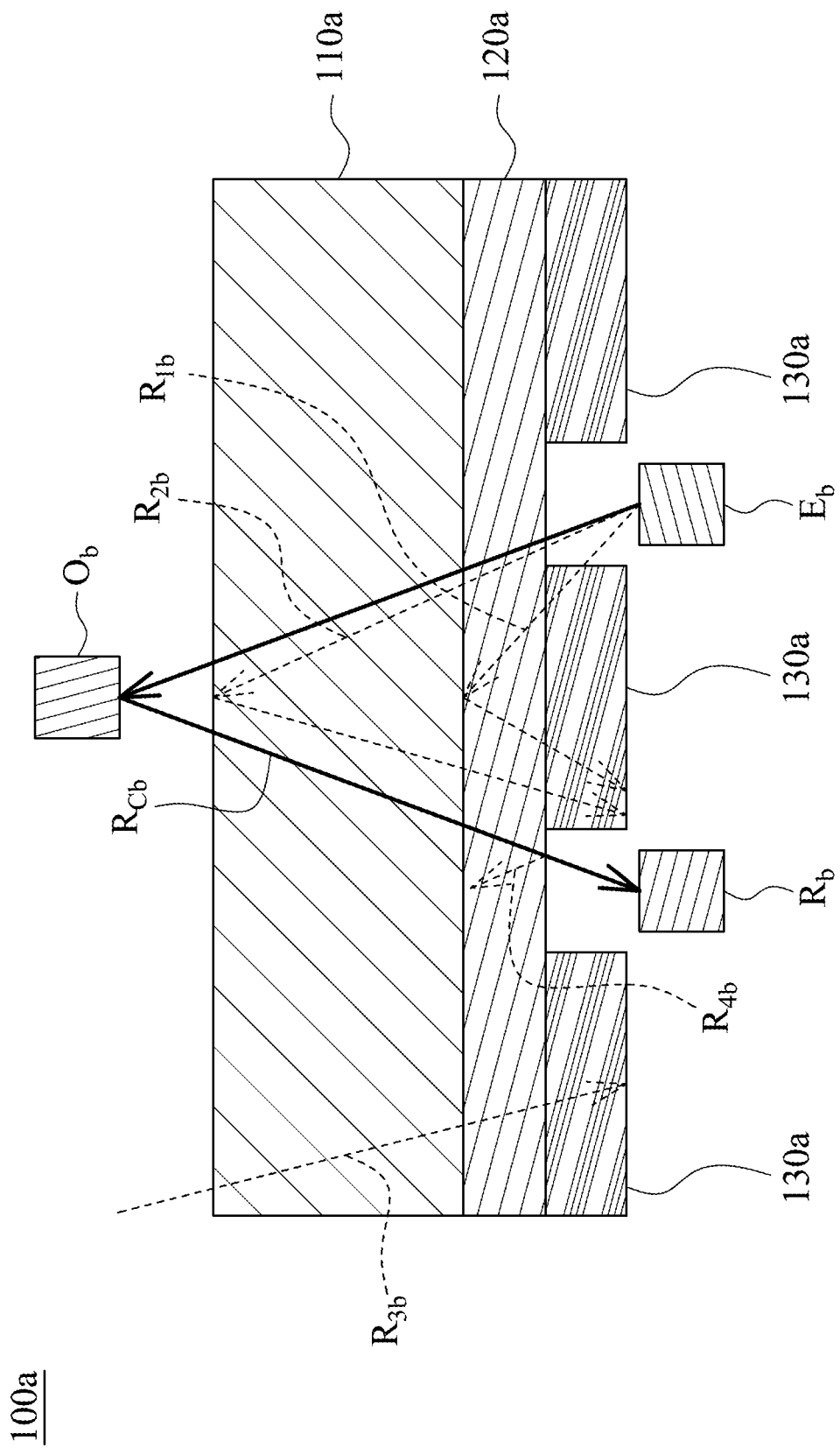
FIG. 3B is a light path schematic view of crosstalk light, noise light and attenuated reflected light in a multilayer light-filtering structure of the present disclosure.

Please refer to FIG. 3A and FIG. 3B. FIG. 3B is a light path schematic view of crosstalk light, noise light and attenuated reflected light in a multilayer light-filtering structure 100a of the present disclosure, wherein a path $R_{1b}$, a path $R_{2b}$, a path $R_{3b}$, a path $R_{4b}$ and a path $R_{Cb}$ shown in FIG. 3B are same as the path $R_{1a}$, the path $R_{2a}$, the path $R_{3a}$, the path $R_{4a}$ and the path $R_{Ca}$ shown in FIG. 3A, respectively, and will not be further described herein.

As shown in FIG. 3B, only a small amount of reflected light is received by the detector $R_b$ after the crosstalk light passing along the path $R_{1b}$ reaching and being reflected by the patterned light-blocking layer 130a with low reflectivity and low transmittance. Further, the crosstalk light passing along the path $R_{2b}$ is not received by the detector $R_b$ due to the crosstalk light is blocked by the patterned light-blocking layer 130a with low reflectivity and low transmittance after the crosstalk light being reflected by a top of the substrate 110a. Moreover, the surrounding noise light passing along the path $R_{3b}$ is not received by the detector $R_b$ due to the surrounding noise light is blocked by the patterned light-blocking layer 130a with low reflectivity and low transmittance after the surrounding noise light transmitting the substrate 110a and the light-filtering layer 120a. On the other hand, the light intensity of the attenuated reflected light passing along the path $R_{4b}$ is reduced by the disposition of the light-filtering layer 120a, because the amount of the light intensity of the attenuated reflected light occurred by light passing through the interface between the substrate 110a and the light-filtering layer 120a is lower than the amount of the light intensity of the attenuated reflected light occurred by light passing through the interface between the substrate 110a and air. Therefore, in comparison with the light intensity of the light emitted by the light source $E_b$, the correct light signal received by the detector $R_b$ only loses about 10% of light intensity, and the light attenuation is improved by 40%, which further indicates that the position of an object $O_b$ is able to be detected more precisely. In other embodiments, another light-filtering layer can be added on another surface of the substrate to replace the interface between the substrate and air so as to reduce light intensity loss of the correct light to 3% or even lower, and the improvement of the light attenuation can reach more than 80%. Therefore, in comparison with the conventional single layer light-filtering structure, the multilayer light-filtering structure of the present disclosure has higher detecting accuracy and practical values.

Figure 4:
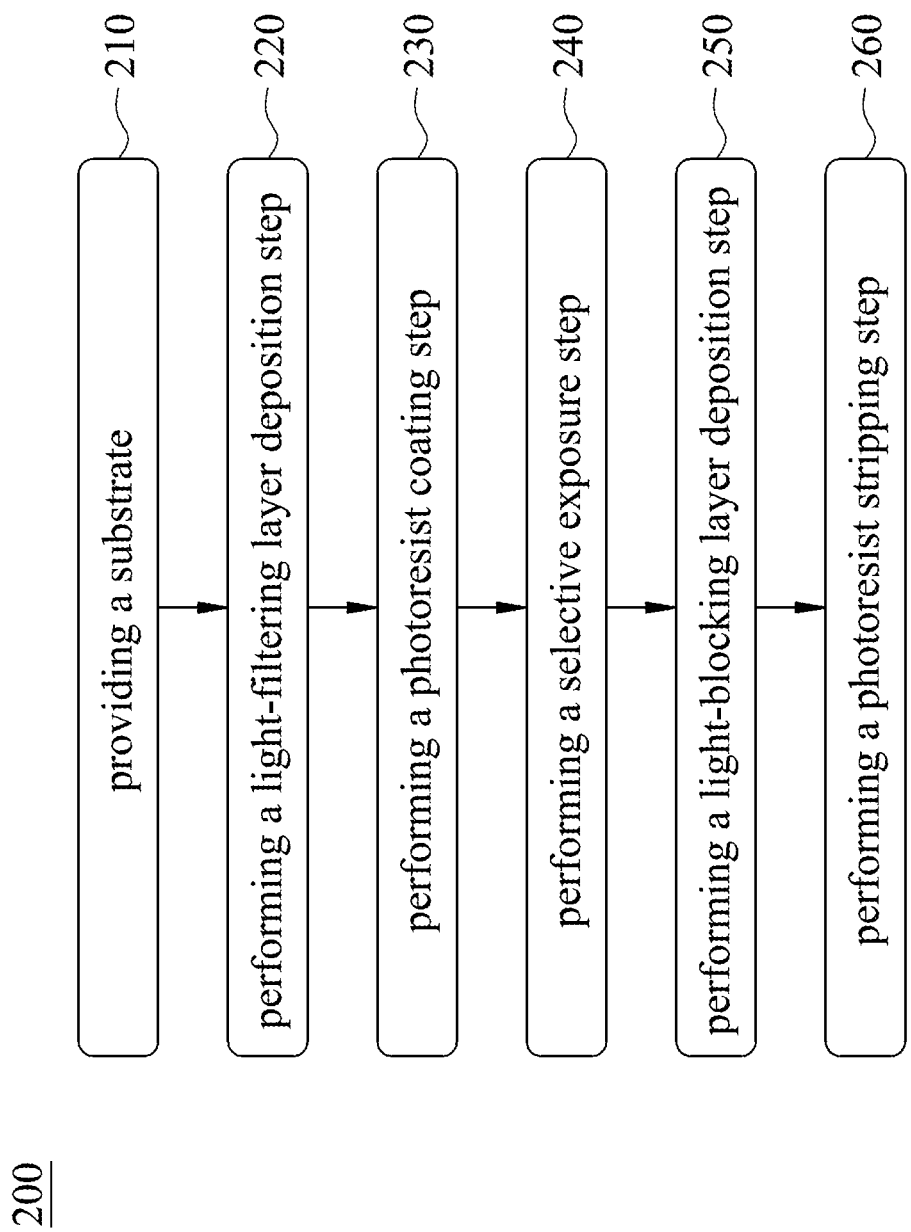
FIG. 4 is a flow diagram showing a multilayer light-filtering structure fabricating method according to another embodiment of the present disclosure.
Figure 5A:
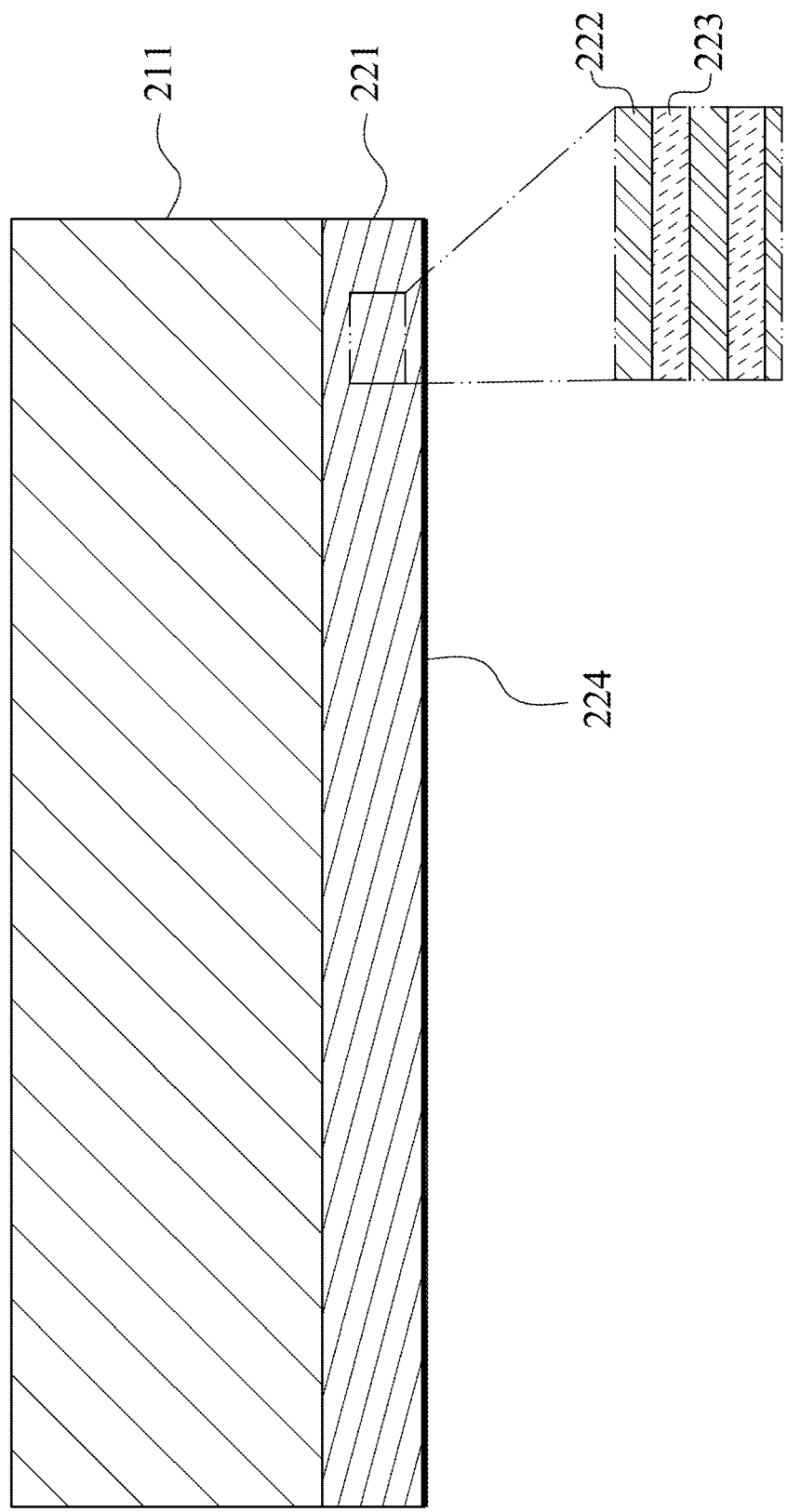
FIG. 5A, FIG. 5B, FIG. 5C and FIG. 5D are schematic views of the multilayer light-filtering structure fabricating method according to another embodiment of the present disclosure.
Figure 5B:
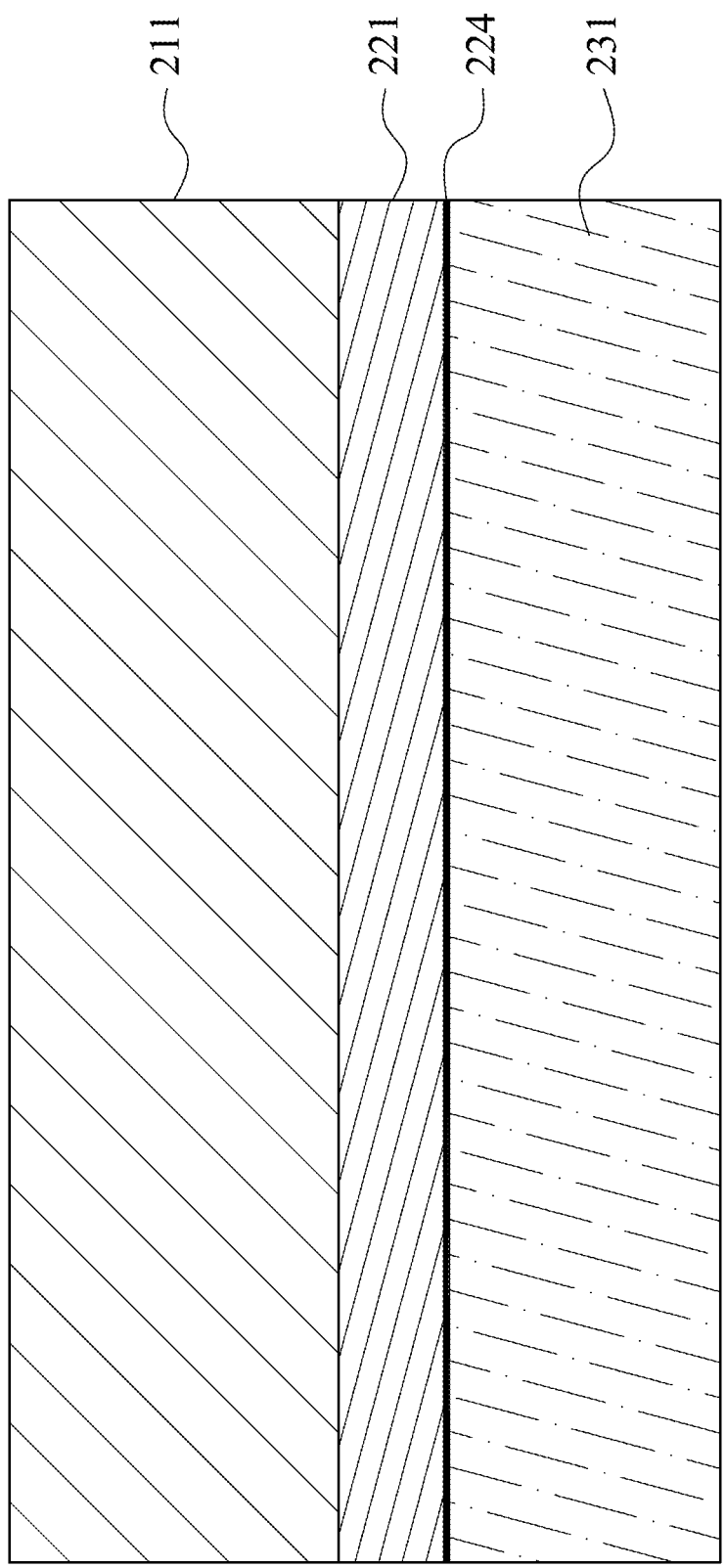
Figure 5C:
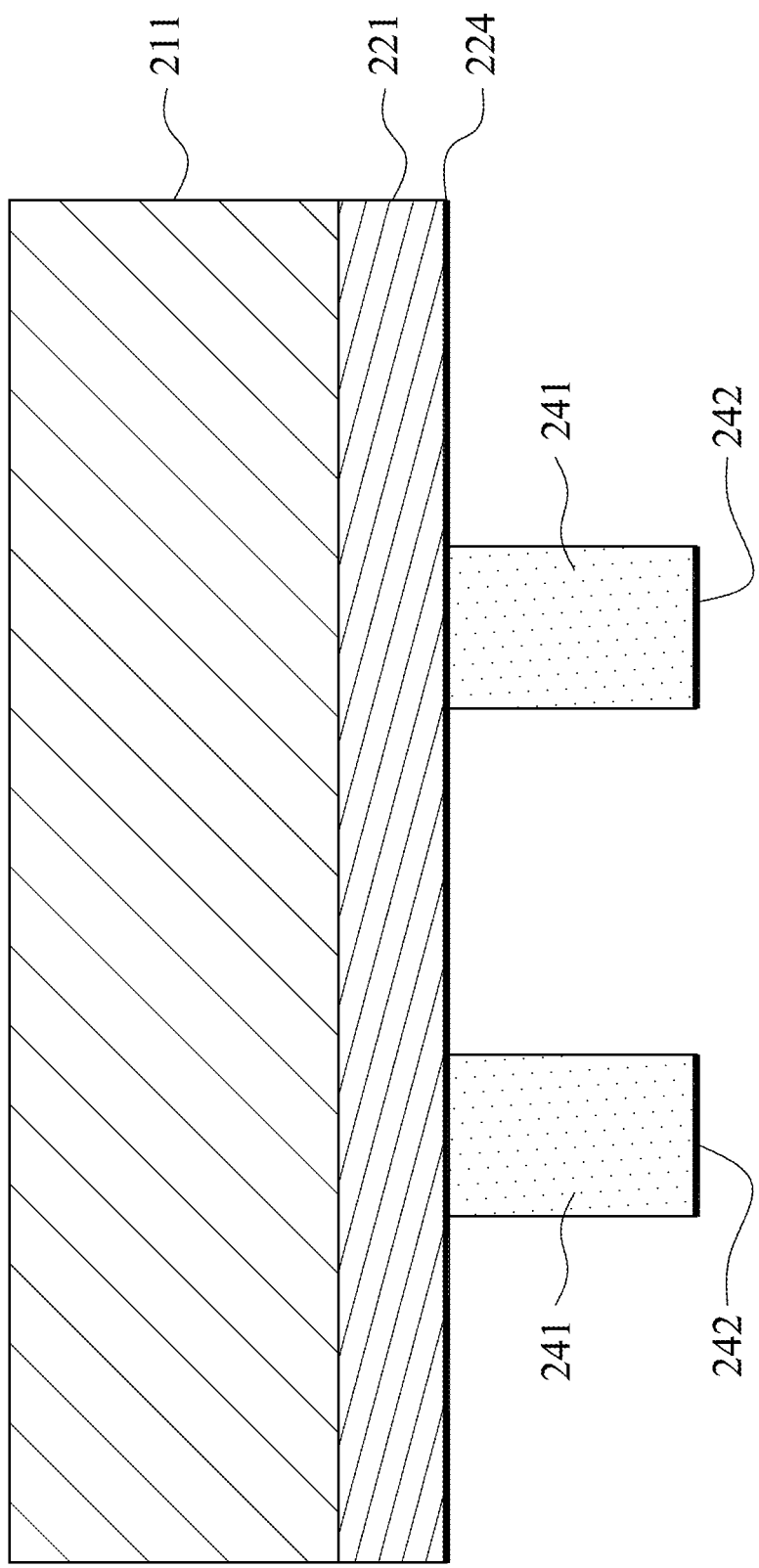
Figure 5D:
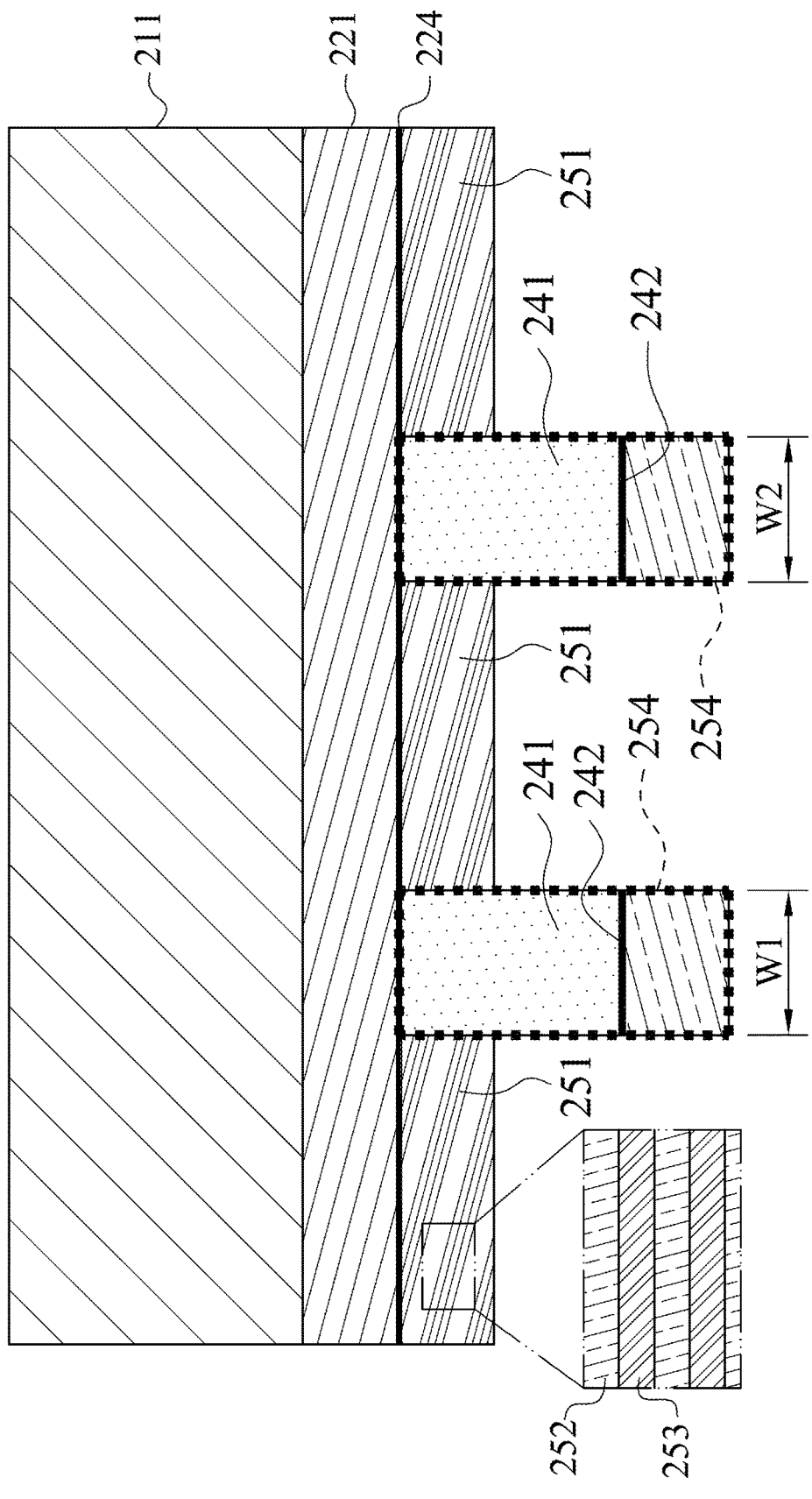

Please refer to FIG. 4, FIG. 5A, FIG. 5B, FIG. 5C and FIG. 5D. FIG. 4 is a flow diagram showing a multilayer light-filtering structure fabricating method 200 according to another embodiment of the present disclosure. FIGS. 5A to 5D are schematic views of the multilayer light-filtering structure fabricating method 200 of the present disclosure. The multilayer light-filtering structure fabricating method 200 includes a step 210, a step 220, a step 230, a step 240, a step 250 and a step 260. FIG. 5A is a schematic view of the step 220. FIG. 5B is a schematic view of the step 230. FIG. 5C is a schematic view of the step 240. FIG. 5D is a schematic view of the step 250.

In the step 210, a substrate 211 is provided. The substrate 211 can be transparent materials such as glass and plastic, but the present disclosure is not limited thereto.

In the step 220, a light-filtering layer deposition step is performed. A plurality of high refractive index films 222 and a plurality of low refractive index films 223 are deposited on a surface of the substrate 211 by a first physical vapor deposition method, the low refractive index films 223 are correspondingly overlapped with the high refractive index films 222 so as to form a light-filtering layer 221, and the light-filtering layer 221 has a first surface 224 away from the substrate 211. The first physical vapor deposition method can be sputter deposition or evaporation, but the present disclosure is not limited thereto.

In detail, a depositing thickness of each of the high refractive index films 222 can be ranged from 3 nm to 800 nm, and the high refractive index films 222 can be aluminum oxide films, titanium dioxide films, tantalum pentoxide films, niobium pentoxide films, silicon hydride films, silicon nitride films, germane films, zirconium dioxide films or the mixture films thereof. Further, a depositing thickness of each of the low refractive index films 223 can be ranged from 3 nm to 800 nm, and the low refractive index films 223 can be aluminum oxide films, titanium dioxide films, tantalum pentoxide films, niobium pentoxide films, silicon hydride films, silicon nitride films, magnesium fluoride films or the mixture films thereof, but the present disclosure is not limited thereto.

In the step 230, a photoresist coating step is performed. A liquid photoresist or a dryfilm photoresist is coated at the first surface 224 so as to form a photoresist layer 231. In detail, a thickness of the photoresist layer 231 can be ranged from 1 μm to 500 μm, but the present disclosure is not limited thereto.

In the step 240, a selective exposure step is performed. The photoresist layer 231 is selectively exposed by a mask aligner and a mask and developed by a developer so as to form a patterned photoresist 241, and the patterned photoresist 241 is connected to the first surface 224 and has a second surface 242 away from the light-filtering layer 221.

In detail, the liquid photoresist or the dryfilm photoresist applied for forming the photoresist layer 231 is not limited to positive photoresist or negative photoresist. However, in order to describe more clearly, the following statement will be described in terms of negative photoresist. The part of the photoresist layer 231 without being exposed during development is dissolved and removed. Subsequently, the first surface 224 of the light-filtering layer 221 is shown and the patterned photoresist 241 is formed, and the patterned photoresist 241 has a second surface 242 away from the light-filtering layer 221.

In the step 250, a light-blocking layer deposition step is performed. A plurality of metal material films 252 and a plurality of dielectric films 253 are deposited on the first surface 224 of the light-filtering layer 221 and the second surface 242 of the patterned photoresist 241 by a second physical vapor deposition method, and the metal material films 252 are correspondingly overlapped with the dielectric films 253 so as to form a patterned light-blocking layer 251 on the first surface 224 of the light-filtering layer 221 and form a plurality of patterned photoresist-containing light-blocking layers 254 on the second surface 242 of the of the patterned photoresist 241. The thickness of the photoresist layer 231 can be greater than a thickness of the patterned light-blocking layer 251. The second physical vapor deposition method can be sputter deposition or evaporation, but the present disclosure is not limited thereto.

In detail, the metal material films 252 can be tantalum films, titanium films, niobium films, aluminum films, zirconium films or the mixture films thereof, and the dielectric films 253 can be tantalum pentoxide films, silicon dioxide films, titanium dioxide films, niobium pentoxide films, aluminum oxide films, zirconium dioxide films or the mixture films thereof, but the present disclosure is not limited thereof.

As shown in FIG. 5D, the patterned photoresist-containing light-blocking layers 254 can independently have a width W1 and a width W2, respectively, wherein the width W1 can be ranged from 0.5 mm to 50 mm and the width W2 can be ranged from 0.5 mm to 50 mm. After the patterned photoresist-containing light-blocking layers 254 being removed, the positions of the patterned photoresist-containing light-blocking layers 254 can be used for disposing a detector and a lighter source, respectively. The width W1 and the width W2 can be reduced according to size of the detector or the lighter source, but the present disclosure is not limited thereto.

In the step 260, a photoresist stripping step is performed. The patterned photoresist-containing light-blocking layers 254 are stripped by a photoresist stripper so as to form a multilayer light-filtering structure (not shown). In detail, the developer applied in step 240 and the photoresist stripper applied in the step 260 can independently be an alkaline solution or an organic solution, such as sodium hydroxide solution, potassium hydroxide and N-Methyl-2-pyrrolidone, but the present disclosure is not limited thereto.

To sum up, the multilayer light-filtering structure and the fabricating method thereof of the present disclosure can be used in various fields, especially in the fields of instruments or components for distance-measuring or detecting. The color and the properties of the multilayer light-filtering structure can be adjusted by adjusting the combinations of the materials of the high refractive index films and the low refractive index films. Further, the detecting accuracy can also be enhanced by the disposition of the light-filtering layer and the patterned light-blocking layer. Therefore, the multilayer light-filtering structure is able to have great performances in aesthetics and concealability, and the multilayer light-filtering structure can be fabricated by the multilayer light-filtering structure fabricating method of the present disclosure. Due to the aforementioned advantages, the multilayer light-filtering structure and the fabricating method thereof of the present disclosure have a great potential of the development in related industries.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A multilayer light-filtering structure, comprising:
   a substrate;
   a light-filtering layer disposed on a surface of the substrate, wherein the light-filtering layer has a first surface away from the substrate, and the light-filtering layer comprises:
      a plurality of high refractive index films; and
      a plurality of low refractive index films, wherein the low refractive index films are correspondingly overlapped with the high refractive index films; and
   a patterned light-blocking layer disposed on the first surface, wherein the patterned light-blocking layer comprises:
      a plurality of metal material films; and
      a plurality of dielectric films, wherein the dielectric films are correspondingly overlapped with the metal material films.

2. The multilayer light-filtering structure of claim 1, wherein the light-filtering layer comprises at least one passband in a wavelength range of 700 nm to 1400 nm, a transmittance of the at least one passband is $T_1$, and the following condition is satisfied:

$T_1 > 70\%$.

3. The multilayer light-filtering structure of claim 2, wherein the transmittance of the at least one passband is $T_1$, and the following condition is satisfied:

$T_1 > 95\%$.

4. The multilayer light-filtering structure of claim 1, wherein a refractive index in a wavelength range of 400 nm to 1400 nm of each of the high refractive index films is $n_1$, an extinction coefficient in a wavelength range of 400 nm to 700 nm of each of the high refractive index films is $k_{11}$, an extinction coefficient in a wavelength range of 800 nm to 1400 nm of each of the high refractive index films is $k_{12}$, a refractive index in a wavelength range of 400 nm to 1400 nm of each of the low refractive index films is $n_2$, an extinction coefficient in a wavelength range of 400 nm to 1400 nm of each of the low refractive index films is $k_2$, and the following conditions are satisfied:

$k_{11} > 0.01$;

$k_{12} < 0.01$;

$k_2 < 0.01$; and $n_1 > n_2$.

5. The multilayer light-filtering structure of claim 1, wherein the high refractive index films are aluminum oxide films, titanium dioxide films, tantalum pentoxide films, niobium pentoxide films, silicon hydride films, silicon nitride films, germane films, zirconium dioxide films or mixture films thereof, and the low refractive index films are aluminum oxide films, titanium dioxide films, tantalum pentoxide films, niobium pentoxide films, silicon hydride films, silicon nitride films, magnesium fluoride films or mixture films thereof.

6. The multilayer light-filtering structure of claim 1, wherein a thickness of each of the high refractive index films is ranged from 3 nm to 800 nm, and a thickness of each of the low refractive index films is ranged from 3 nm to 800 nm.

7. The multilayer light-filtering structure of claim 1, wherein the light-filtering layer has a color of black, blue, green, yellow or red, and a L* value of the light-filtering layer in a coordinate of CIELAB color space is less than 40.

8. The multilayer light-filtering structure of claim 1, wherein a reflectivity in a wavelength range of 400 nm to 700 nm of the light-filtering layer is $R_1$, a transmittance in a wavelength range of 400 nm to 700 nm of the light-filtering layer is $T_2$, an absorption rate in a wavelength range of 400 nm to 700 nm of the light-filtering layer is $A_1$, and the following conditions are satisfied:

$R_1 < 20\%$;

$T_2 < 20\%$; and $A_1 > 70\%$.

9. The multilayer light-filtering structure of claim 8, wherein the reflectivity in the wavelength range of 400 nm to 700 nm of the light-filtering layer is $R_1$, the transmittance in the wavelength range of 400 nm to 700 nm of the light-filtering layer is $T_2$, the absorption rate in the wavelength range of 400 nm to 700 nm of the light-filtering layer is $A_1$, and the following conditions are satisfied:

$R_1 < 5\%$;

$T_2 < 1\%$; and $A_1 > 95\%$.

10. The multilayer light-filtering structure of claim 1, wherein the light-filtering layer has a color of silver, blue, green, yellow or red, and a L* value of the light-filtering layer in a coordinate of CIELAB color space is greater than 60.

11. The multilayer light-filtering structure of claim 1, wherein a reflectivity in a wavelength range of 400 nm to 700 nm of the light-filtering layer is $R_2$, and the following condition is satisfied:

$R_2 > 40\%$.

12. The multilayer light-filtering structure of claim 1, wherein a reflectivity and a transmittance of the patterned light-blocking layer are both less than 1%.

13. The multilayer light-filtering structure of claim 1, wherein the metal material films are tantalum films, titanium films, niobium films, aluminum films, zirconium films or mixture films thereof, and the dielectric films are tantalum pentoxide films, silicon dioxide films, titanium dioxide films, niobium pentoxide films, aluminum oxide films, zirconium dioxide films or mixture films thereof.

* * * * *